(12) United States Patent
Meredith et al.

(10) Patent No.: US 9,832,320 B2
(45) Date of Patent: *Nov. 28, 2017

(54) METHOD AND APPARATUS FOR RECEIVING WIRELESS COMMUNICATIONS

(71) Applicants: AT&T INTELLECTUAL PROPERTY I, L.P., Atlanta, GA (US); AT&T Mobility II LLC, Atlanta, GA (US)

(72) Inventors: Sheldon Kent Meredith, Roswell, GA (US); Yuang Lou, Dunwoody, GA (US); Mario Kosseifi, Roswell, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/256,836

(22) Filed: Sep. 6, 2016

(65) Prior Publication Data

US 2016/0373587 A1    Dec. 22, 2016

Related U.S. Application Data

(63) Continuation of application No. 14/500,223, filed on Sep. 29, 2014, now Pat. No. 9,467,183.

(51) Int. Cl.
*H04B 7/08* (2006.01)
*H04B 1/06* (2006.01)
(Continued)

(52) U.S. Cl.
CPC ............ *H04M 11/007* (2013.01); *H04B 1/16* (2013.01); *H04B 7/02* (2013.01); *H04B 7/026* (2013.01);
(Continued)

(58) Field of Classification Search
CPC ........ H04B 1/0067; H04B 1/406; H04B 7/02; H04B 7/026; H04B 7/0404; H04B 7/0608;
(Continued)

(56) References Cited

U.S. PATENT DOCUMENTS 6,529,746 B1   3/2003   Kotzin
7,340,236 B2   3/2008   Liang et al.
(Continued)

FOREIGN PATENT DOCUMENTS

JP   2001086046       3/2001
JP   2006332749 A    12/2006
KR   2004046367       6/2004

*Primary Examiner* — Quochien B Vuong
(74) *Attorney, Agent, or Firm* — Guntin & Gust, PLC; Robert Gingher

(57) ABSTRACT

Aspects of the subject disclosure may include, for example, a method for down-converting a long-range communication signal that is wirelessly received via a first antenna of a communication device to extract a first version of a baseband signal, down-converting a short-range communication signal wirelessly received from a second device via a second antenna of the communication device to extract a second version of the baseband signal from the long-range communication signal that can be received at the second device, which is remote from the communication device, via a second antenna. The first version and second version of the baseband signal can be combined to generate an information signal that can be processed. Other embodiments are disclosed.

20 Claims, 8 Drawing Sheets

(51) Int. Cl.
*H04M 11/00* (2006.01)
*H04B 1/16* (2006.01)
*H04W 4/00* (2009.01)
*H04L 25/02* (2006.01)
*H04B 7/02* (2017.01)
*H04W 76/02* (2009.01)
*H04B 7/026* (2017.01)
*H04B 7/12* (2006.01)
*H04B 17/336* (2015.01)
*H04B 7/0404* (2017.01)
*H04L 12/26* (2006.01)
*H04W 88/06* (2009.01)

(52) U.S. Cl.
CPC ............ *H04B 7/0404* (2013.01); *H04B 7/082* (2013.01); *H04B 7/12* (2013.01); *H04B 17/336* (2015.01); *H04L 25/02* (2013.01); *H04L 43/028* (2013.01); *H04W 4/008* (2013.01); *H04W 76/025* (2013.01); *H04W 88/06* (2013.01)

(58) Field of Classification Search
CPC .. H04B 7/0689; H04B 7/0817; H04B 7/0825; H04B 7/0871; H04B 17/318; H04B 17/336; H04M 1/72527; H04W 84/12
USPC ....... 455/101, 132, 133, 134, 135, 269, 272, 455/277.1, 277.2, 552.1, 553.1, 556.1, 455/557
See application file for complete search history.

(56) References Cited

U.S. PATENT DOCUMENTS

| | | |
|---|---|---|
| 7,505,790 B2 | 3/2009 | Chang et al. |
| 8,649,825 B2 | 2/2014 | van Wonterghem et al. |
| 8,655,288 B2 | 2/2014 | Khan |
| 2005/0208900 A1 | 9/2005 | Karacaoglu et al. |
| 2005/0245234 A1 | 11/2005 | Stopek |
| 2012/0329513 A1 | 12/2012 | Jung et al. |
| 2013/0237283 A1 | 9/2013 | Harrison et al. |
| 2014/0065948 A1 | 3/2014 | Huang |

400

METHOD AND APPARATUS FOR RECEIVING WIRELESS COMMUNICATIONS

CROSS-REFERENCE TO RELATED APPLICATIONS

This application is a continuation of and claims priority to U.S. patent application Ser. No. 14/500,223, filed Sep. 29, 2014, the contents of which are hereby incorporated by reference herein in its entirety.

FIELD OF THE DISCLOSURE

The subject disclosure relates to a method and apparatus for receiving wireless communications and, more particularly, for improving wireless reception capability for mobile communications.

BACKGROUND

Communication systems, such as a mobile communications system, can be used for providing various services, including voice, video and/or data services, and user location information can be important for next generation IP multi-media services provided by telecommunication systems. Wireless communication systems are increasingly being adopted by consumers as their chief means for accessing services of telecommunication systems. As the number of users and their service requirements increase, the load on wireless network increases as does the need for providing consistently excellent reception of wireless signals. Infrastructure expansion and improvement can improve reception performance but are costly.

BRIEF DESCRIPTION OF THE DRAWINGS

Reference will now be made to the accompanying drawings, which are not necessarily drawn to scale, and wherein.

DETAILED DESCRIPTION

Figure 1:
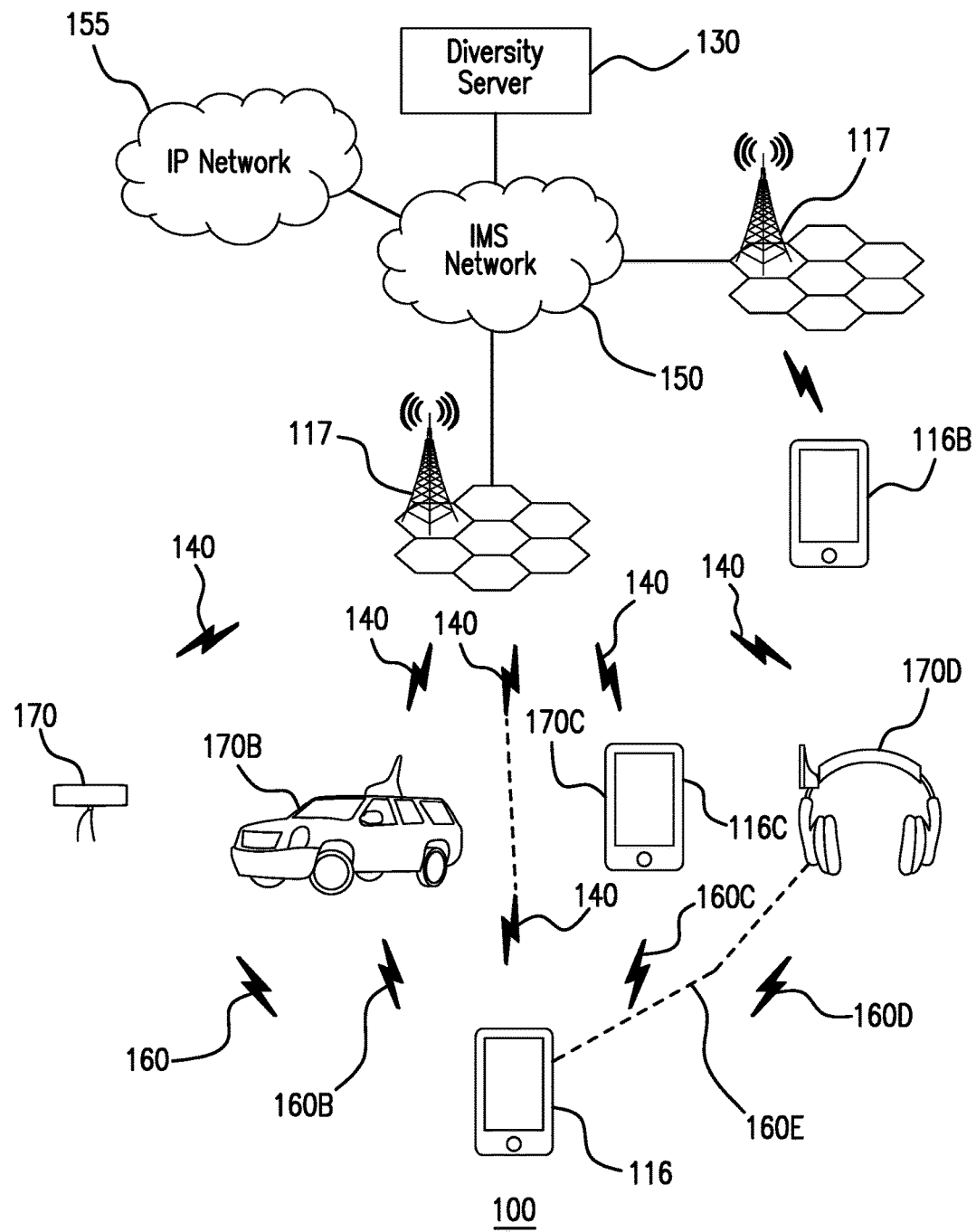
FIG. 1 depicts illustrative embodiments of a system for providing communication services for mobile and stationary devices in a mobile communication network.

The subject disclosure describes, among other things, illustrative embodiments for providing signal diversity for a mobile communication device in a communication system. Other embodiments are described in the subject disclosure.

One or more aspects of the subject disclosure include a method and a system for providing a diversity radio frequency signal for a mobile communication device. A diversity device, which can be a peripheral device, can receive a long-range communication signal from a communication system via an antenna and a receiver circuit. The diversity device can demodulate the received long-range communication signal to extract a baseband, or information, signal from a first carrier signal. The diversity device can transmit the extracted baseband signal to a mobile communication device via a wired connection or via a wireless connection. If the baseband signal is transmitted via a wireless connection, then the diversity device can modulate the baseband signal with a second carrier signal to generate a short-range communication signal.

The mobile communication device can receive the same long-range communication signal from the communication system plus the short-range communication signal from the diversity device. The mobile communication device and the diversity device can be operating at different locations and, in particular, can be physically spaced apart such that environmental signal destruction of the long-range communication signal differs at the different locations. As such, the long-range communication signal that is received at the diversity device can be an excellent spatially diverse representation of the long-range communication signal received at the mobile communication device. The mobile communication device can compare a first version of the baseband signal that is extracted from the long-range communication signal that is received at the mobile communication device with a second version of the baseband signal that is received at the mobile communication device via the short-range communication signal and/or a wired signal. The mobile communication device can compare one or more quality characteristics of the first and second versions of the baseband signals to determine, via diversity, which version to subject to subsequent processing as a selected information signal.

One embodiment of the subject disclosure includes a method including wirelessly receiving, by a mobile communication device, a long-range communication signal via a first antenna of the mobile communication device and, in turn, extracting, by the mobile communication device, a first version of a baseband signal from the long-range communication signal that is received via the first antenna. The long-range communication signal can include the baseband signal modulated with the first carrier signal. The method can include wirelessly receiving, by the mobile communication device, a short-range communication signal from a second device via a second antenna of the mobile communication device. The short-range communication signal can include a second version of the baseband signal that is modulated with a second carrier signal by the second device. The second version of the baseband signal can be extracted from the long-range communication signal by the second device. The long-range communication signal can be wirelessly received by the second device at a location remote from the mobile communication device. The method can also include extracting, by the mobile communication device, the second version of the baseband signal from the short-range communication signal that is received via the second antenna. The method can further include determining, by the mobile communication device, a difference in quality of signal between the first version of the baseband signal and the second version of the baseband signal. The method can include selecting, by the mobile communication device, one of the first version of the baseband signal or the second version of the baseband signal according to the difference in quality of signal to identify an information signal and, in turn, processing, by the mobile communication device, the information signal that is selected.

One embodiment of the subject disclosure includes a communication device including a memory to store executable instructions and a processor. The executable instructions, responsive to being executed by the processor, can facilitate performance of operations including wirelessly receiving a long-ranged communication signal comprising a first information signal modulated with a first carrier signal and, in turn, extracting a first version of an information signal from the first carrier signal. The operations can also include modulating the first version of the information signal with a second carrier signal to generate a short-range communication signal. The operations can further include transmitting the short-range communication signal to a communication device. The first version of the information signal can be extracted from the second carrier signal by the communication device. The communication device can receive a long-ranged communication signal including a second version of the information signal. The communication device can determine a corruption of contents for the second version of the information signal. The communication device can select the first version of the information signal for processing over the second version of the information signal based on the corruption of the contents of the second version of the information signal.

One embodiment of the subject disclosure includes a machine-readable storage device, including executable instructions which, responsive to being executed by a processor, facilitate performance of operations including down-converting a long-range communication signal that is wirelessly received via a first antenna of a communication device to extract a first version of a baseband signal. The operations can also include down-converting a short-range communication signal that is wirelessly received from a second device via a second antenna of the communication device to extract a second version of the baseband signal. The second version of the baseband signal can be extracted from the long-range communication signal that is received at the second device, which is remote from the communication device, via a second antenna of the second device. The operations can further include combining the first version of the baseband signal and the second version of the baseband signal according to generate an information signal that, in turn, is processed.

FIG. 1 depicts illustrative embodiments of a system for providing communication services for devices in a mobile communication network. In FIG. 1, a mobile communication system 100 is illustrated that can provide wireless communication services, including voice, video and/or data services to mobile communications devices 116 and 116B-C. System 100 can enable wireless communication services over a number of different networks. Mobile communication devices 116 and 116B-C can include a number of different types of devices that are capable of voice, video and/or data communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal 140. The mobile communication device 116 can communicate, via the IMS network 150, with other mobile communication devices 116B, with landline communication devices, and with the IMS network 150, or with an Internet Protocol (IP) network, such as the Internet or the world-wide web (WWW). The communication system 100 can provide communications and sharing of various resources between mobile communication devices 116 and 116B-C and various devices, such as computer devices, which are connected to the IMS network 150.

In one or more embodiments, a mobile communication device 116 can receive a long-range communication signal 140, such as a cellular communications signal. For example, the long-range communication signal 140 can be transmitted by one or more a cellular base stations 117. On or more cellular base stations 117 can be part of a network of cellular base stations 117 that make up a cellular communications network that provides wireless access to the IMS network 150. In one or more embodiments, the long-range communication signal 140 can be a cellular communications signal that is encoded according to an encoding scheme, such as, for example, frequency division multiple access (FDMA) or code division multiple access (CDMA) encoding. In other examples, the encoding can use polarization division multiple access (PDMA) or time division multiple access for multiplexing several communication channels over each cellular base station.

In one or more embodiments, the long-range communication signal 140 can originate from the IMS network 150. In one embodiment, the mobile communication device 116 can engage in a calling session with another communication device 116B. In another embodiment, the mobile communication device 116 can engage in a data communication session with the IMS network to access, for example, digital media content, such as content from the IP Network 155. In one embodiment, the mobile communication device 116 can transmit information, such as voice or data information, to the IMS network 150 via another long-range communication signal 140 that is generated at the mobile communication device 116.

In one or more embodiments, the long-range communication signal 140 can include an information content signal, called a baseband signal that has been modulated with a carrier signal. The baseband signal can include voice and/or data information that can be encoded according to the cellular signal encoding scheme that is used for the cellular communication system. The carrier signal can be a frequency signal, typically in the range of 700 MHz to 2.6 GHz, for transmitting a cellular communication signal. By comparison, the baseband signal can lower frequency information of 0 MHz to 50 MHz. The modulated combination of the carrier frequency carrier and the baseband signal allows the baseband information to be propagated relatively long distances (miles), such mobile communication devices 116 can communicate with a network of cellular base stations 117. In one or more embodiments, to maximize the number of cellular user that can be serviced while minimizing interference between those users, specific slices of the cellular communication spectrum can be sold for use by service providers by the Federal Communications Commission. To accommodate cellular traffic, each service provider can slice up its frequency bandwidth and assign this bandwidth for use by mobile communication devices 116. In one embodiment, the cellular base stations continually assign and re-assigned slices of the available bandwidth to individual mobile communication devices 116, typically multiplexing the same frequencies between multiple mobile communication devices 116 via a division multiple access scheme. As a result, the specific carrier frequency of a long-range communication signal transmitted by a cellular base station 117 and/or a mobile communication device 116 can vary over time. However, at any given time a communications channel between a cellular base station 117 and a mobile communication device 116 can have a specific carrier frequency.

In free space, a long-range communication signal 140 loses strength as it propagates away from its source such that the strength at a distance from, for example, a cellular base station 117 is proportional to the inverse of the square of the distance from the cellular base station 117. However, in real-world conditions, the propagated strength of the long-range communication signal 140 can be significantly affected by positive and/or negative vector components that cause signal reflection, refraction, diffraction, absorption, polarization, and/or scattering due to a variety of environmental factors, including solar activity, building/structures, weather conditions, and/or interference with other radio frequency signals. As a result, the signal strength of the long-range communication signal 140 does not perfectly track the predicted inverse square level in the real-world environment. Rather, signal strength at any location from the source is found to be the result of a complex set of interactions between the long-range communication signal 140 and the overall radio environment. As a result, the long-range communication signal 140 can exhibit substantial destruction in predicted signal strength (−10 dB to −30 dB) due environmental destruction of the signal. Moreover, this loss of signal strength is not consistent from location to location nor and can vary considerably even for locations that are relatively close to one another. Changes in amplitude, phase, and polarization of the long-range communication signal 140, as it propagates from the source, can cause variation in local signal strength, whereby the signal can fade or gain 10 dB between two locations that are separated by only a few wavelengths. Hence the spatial location and angular orientation of antennas placed in the radio environment can have a large impact on reception capabilities.

In one or more embodiments, the IMS network 150 can send long-range communication signals 140 to mobile communication devices 116 and 116B-C. A mobile communication device 116 can receives the long-range communication signal 140. In one embodiment, the mobile communication device 116 can receive the long-range communication signal 140 at an antenna that is integrated within the mobile communication device 116. In one embodiment, the mobile communication device 116 can demodulate the long-range communication signal 140 that has been received to extract the baseband signal from the carrier frequency signal.

In one or more embodiments, the long-range communication signal 140 can be received by one or more other communication devices 170 and 170B-D, any of which can serve as a diversity device 170 and 170B-D for the mobile communication device 116. For example, the long-range communication signal 140 can be received at a cellular antenna device 170 that can be installed at a rooftop or vicinity where a subscriber uses the mobile communication device 116. In other examples of diversity devices, the long-range communication signal can be received at a vehicle-based cellular system 170B, a second mobile communication device 170C, and/or a peripheral device 170D that includes a cellular communication capability.

In one or more embodiments, a diversity device 170 and 170B-170D that receives the long-range communication signal 140 from the a cellular base station 117 of the IMS network 150 can provide a remote, diversity antenna function for the mobile communication device 116. While the long-range communication signal 140 that is received at an antenna at the diversity device 170 is theoretically the same as the long-range communication signal 140 that is received at the mobile communication device 116, in fact, the radio frequency environments and propagation path that is traversed by the long-range communication signal 140 differs. Hence, the long-range communication signal 140 captured at the diversity device 170 antenna can exhibit gain or fade with respect to the long-range communication signal 140 captured at the mobile communication device 116 due to differences in environment, propagation path, location, and/or orientation of the antennas of the diversity device 170 and the mobile communication device 116.

In one or more embodiments, the diversity device 170 can demodulate, or down convert, the long-range communication signal 140 that is received at the diversity device 170. By demodulating the long-range communication signal 140, the diversity device 170 can extract the baseband signal from the carrier signal. Therefore, the mobile communication device 116 can extract a first version of the baseband signal from the long-range communication signal 140 received at the mobile communication device 116, and the diversity device 170 can extract a second version of the baseband signal from the long-range communication signal 140 received at the diversity device 170.

In one or more embodiments, the diversity device 170 can transmit the second version of the baseband signal to mobile communication device 116. In one embodiment, the diversity device 170 can wirelessly transmit the baseband signal in a short-range communication signal 160. For example, the diversity device 170 can modulate the second version of the baseband signal to generate a wireless communication signal 160. In one example, the diversity device 170 can modulate the second version baseband signal with a short-range carrier frequency signal to generate a short-range communication signal 160. In one embodiment, the second version of the baseband signal that is extracted from the long-range communication signal 140 received at the diversity device 170 can be encoded into a digital format via an analog-to-digital conversion before modulation with the short-range carrier signal. In one example, the short-range communication signal 160 can be a Bluetooth™ signal that can be wirelessly transmitted from the diversity device 170 to the mobile communication device 116.

In one or more embodiments, additional versions of the baseband signal can be extracted from the long-range communication signal 140 by reception of the long-range communication signal 140 at one or more of the diversity devices 170 and 170B-D. For example, the long-range communication signal 140 can be received at vehicle cellular system 170B, which can, in turn extract a version of the baseband signal and transmit this version to the mobile communication device 116 via a wireless communication signal 160B, such as a WiFi link. Therefore, a subscriber of a mobile communication device 116 can receive a diversity signal from a vehicle in which the subscriber is an occupant. In another example, the long-range communication signal 140 can be received at a second mobile communication device 170C, which can, in turn transmit a version of the baseband signal to a subscriber's mobile communication device 116 using a wireless communication link 160C that is between the two devices 116 and 170C.

In one or more embodiments, the diversity device 170D can be a peripheral device, such as a set of wired or wireless headphones, mouse, keyboard, or the like, can be coupled to the mobile communication device via a wireless communication link 160D or via a wired connection 160E. The peripheral device version of the diversity device 170D can be connected to the mobile communication device 116 for the purpose of supporting a peripheral function unrelated to diversity. For example, the mobile communication device 116 can have a wired connection 160E to a set of headphones 170D for the purpose of transmitting an audio signal from the mobile communication device 116 to the headphones 170D for reproduction of audible sound at the headphones 170D. A wireless antenna can be integrated into the headphones 170D for the purpose of receiving long-range communication signals 140 from the IMS system 150. The headphones 170D can transmit a filtered or unfiltered version of the received long-range communication signal 140 to the mobile communication device 116 using the wired connection 160E. In one embodiment, the received long-range communication signal 140 can be demodulated to remove extract the second version of the baseband signal from the carrier signal, and the second version of the baseband signal can be transmitted to the mobile communication device 116 via the wired connection. In one embodiments, the mobile communication device 116 and the headphone version of the diversity device 170D can be wirelessly connected via, for example, a Bluetooth™ link. The Bluetooth™ link can be used for transmitting audio content from the mobile communication device 116 to the diversity device 170 for reproducing sound using the headphone function of the diversity device 170, while the Bluetooth™ link can be used for transmitting the second version of the baseband signal from the diversity device 170D to the mobile communication device 116. In other embodiments, the diversity device 170D can be another peripheral device, such as a speaker device, an amplifiers device, a radio device, a charging device for a mobile communication device 116 or for another device, a camera or video device, a memory device, and/or a display device.

In one or more embodiments, the mobile communication device 116 can receive the long-range communication signal 140 from the cellular base station 117 and the short-range communication signal 160 from the diversity device 170. In one embodiment, the mobile communication device 116 can determine a quality measure for the long-range communication signal 140 and the short-range communication signal 160 and can use this quality measure to decide which of these signals will be processed by the mobile communication device 116. The mobile communication device 116 can determine one or more quality measures for the received signals 140 and 160, such a signal strength, differential signal strength, bit error rate, error codes, and/or cyclic redundancy codes (CRC).

In one or more embodiments, the mobile communication device 116 can compare the one or more signal quality measures for the long-range communication signal 140 and the short-range communication signal 160 and use this comparison to determine which signal to select for further processing and which to discard. In another embodiment, the mobile communication device 116 can default to always selecting one of the long-range communication signal 140 or the short-range communication signal 160 and only switch to the non-default signal if the quality metric for the default signal falls below a predetermined level. In one embodiment, the mobile communication device 116 can combine the long-range communication signal 140 and the short-range communication signal 160 to generate a combined communication signal for processing by the mobile communication device 116.

In one or more embodiments, a diversity server 130 can configure signal diversity operations of the diversity devices 170 and 170B-D and/or the mobile communication device 116. In various embodiments, the diversity server 130 can enable/disable the signal diversity function of a diversity device 170. For example, the diversity server 130 can communicate with a diversity device 170C to direct the device 170C to enable or disable a function for receiving a long-range communication signal 140 and transmitting a short-range communication signal 160C generated from the long-range communication signal 140. In another embodiment, the diversity server 130 can transmit communications to a diversity device 170C to direct the device 170C to receive a long-range communication signal 140 of a specific frequency or frequency range or range of frequencies. The diversity device 170C can target a specific frequency or range by altering a filtering configuration and/or a demodulation frequency at the diversity device 170C. In one or more embodiments, the diversity server 130 can communicate with the diversity device 170D to direct the diversity device 170D to enabling transmitting a baseband signal that has been extracted from the long-range communication signal 140 via a wireline signal 160E. In one or more embodiments, the diversity server 130 can communicate with the diversity device 170D to direct the diversity device 170D to enabling transmitting a baseband signal that has been extracted from the long-range communication signal 140 via the short-range communication signal 160D. In one or more embodiments, the diversity server 130 can direct the diversity device 170B to transmit the baseband signal to the mobile communication device 116 via the short-range communication signal 160B via a specific frequency and/or range of frequencies.

In one or more embodiments, the diversity server 130 can direct the mobile communication device 116 to enable or disable reception and/or use of the baseband information from the diversity device 170. The diversity server 130 can direct the diversity device 170 to receive a long-range communication signal from the mobile communication device 116 and to forward or repeat this long-range communication signal to the cellular base station 117. In one or more embodiments, the diversity server 130 can direct the mobile communication device 116 to select an information signal for processing, to perform the diversity analysis and/or selection according to a particular scheme, and/or to select between more than one diversity device 170 and 170B-D.

In one or more embodiments, a user of a mobile communication device 116 can access the diversity server 130 via the IMS network and/or the IP network. For example, the user can contact the diversity server 130 via a voice-directed service or an SMS-based service by calling a telephone number. The user can make changes in the signal diversity setup for the mobile communication device 116 via the voice-directed service to configure, for example, a diversity device 170B to operate with the mobile communication device 116. In another embodiment, the user can contact the diversity server 130 via the IP network using, for example, a web-based portal. In another embodiment, a user can contact the diversity server 130 via the diversity device 170B, for configuring the signal diversity system or the role of the diversity device 170B in that system.

Figure 2A:
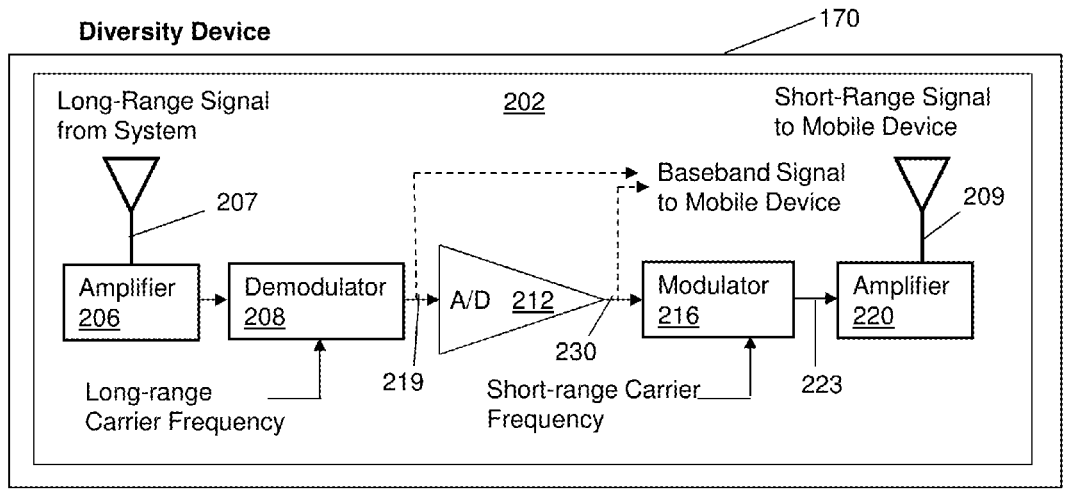
FIGS. 2A-2B depict illustrative embodiments of a system for providing signal diversity in a mobile communications system.
Figure 2B:
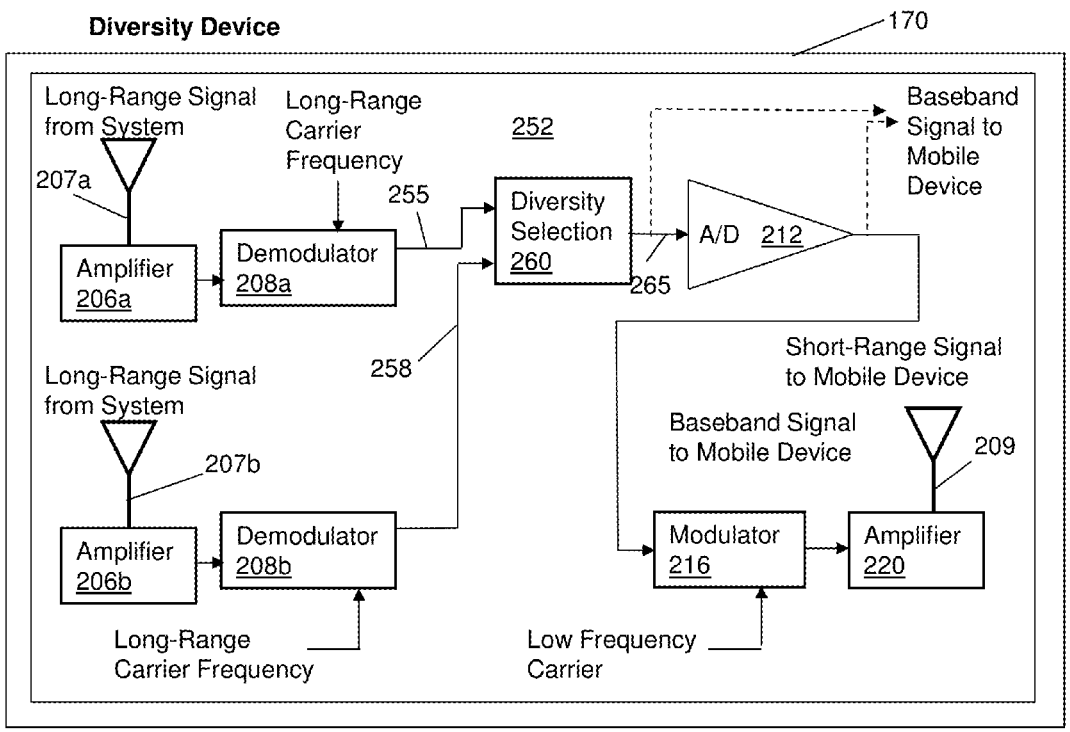

FIGS. 2A and 2B depict illustrative embodiments of systems 200 and 250 for providing signal diversity in a mobile communications system. In one or more embodiments, a diversity device 170 can include a system for receiving a long-range communication signal, extracting a baseband signal, and transmitting the baseband signal to a mobile communication device 116. In various embodiments, a diversity device 170 can include a signal path 202 with an input antenna 207, an input amplifier 206, a demodulator 208, and analog-to-digital convertor 212, a modulator 216, an output amplifier 220, and/or an output antenna 209. In one embodiment, the diversity device 170 can receive the long-range communication signal 140 at the input antenna 207. An input amplifier 206 can be used to amplify the long-distance communication signal 140. In one embodiment, the input amplifier 206 can further include a broadband filter for filtering out components of the received input signal that are not of interest, particularly components that are not in the frequency range for the carrier signal of the long-range communication signal 140. In one embodiment, the input amplifier 206 can be adjusted by the diversity server 130 and/or the mobile communication device 116. For example, the gain of the input amplifier and/or performance of the broadband filter can be adjusted.

In one or more embodiments, the output of the input amplifier 206 can be processed at a demodulator 208, or down convertor. The demodulator 208 can strip away the baseband signal from the carrier signal of the received long-range communication signal. The demodulator 208 can include mixing the received signal with a signal of the same frequency as the carrier to extract the baseband signal. In one embodiment, the diversity server 130 and/or the mobile communication device 116 can direct the diversity device 170 to adjust the frequency of the carrier signal that is used for demodulating the received long-range signal 140. For example, if the mobile communication device 116 is attempting to receive and demodulate a long-range communication signal 140 with an 800 MHz carrier frequency, then the demodulator 208 can mix the received long-range communication signal 140 with an 800 MHz signal at the diversity device 170 to extract the baseband signal, which can be, for example, a lower frequency signal in the range of 0 Hz to 50 MHz. In one embodiment, the demodulator 208 can be a two-stage demodulator, where the received long-range communication signal 140 can, first, be down converted to a mid-frequency and, second, further down converted to the baseband frequency. The use of a two-stage demodulator can prevent wrap around in the demodulated signal. For example, the demodulator 208 can receive a long-range communication signal 140 in the range of between 1.0 GHz and 1.05 GHz. The demodulator 208 can, first, down convert the input signal to a 200 MHz to 250 MHz range and, second, to a baseband range of 0 MHz to 50 MHz.

In one or more embodiments, the diversity device 170 can transmit the demodulated baseband signal 219 to the mobile communication device 116. For example, the demodulated baseband signal 219 can be transmit over a wireline connection between the diversity device 170 and the mobile communication device 116. In one embodiment, the diversity device 170 can convert the demodulated baseband signal 219 from an analog signal to a digital signal via an analog-to-digital converter 212. The digital version of the baseband signal 230 can be sent to the mobile communication device 116 via a wireline communication link.

In one or more embodiments, the digital version of the baseband signal 230 can be mixed with a short-range carrier signal at a modulator 216 to generate a modulated, lower frequency signal 223. In one embodiment, the modulated, lower frequency signal 223 can be amplified at output amplifier 220 and wirelessly transmitted by the diversity device 170 via an output antenna 209. In one or more embodiments, the digital baseband signal 230 can be modulated with a carrier frequency of the short-range communication link. For example, the short-range communication link can use a carrier frequency of about 2.4 GHz, if the short-range link is compatible with the Bluetooth™ standard. The output amplifier 220 can generate an output voltage profile that conforms to the specification requirements for the wireless output signal, such as the signal voltage requirements for a Bluetooth™ signal.

Referring now to FIG. 2B, another embodiment 250 of the diversity device 170 can include a means for receiving multiple versions of the long-range communication signal 140 at the diversity device 170 and selecting one version of a baseband signal 265 from the long-range communication signals 140 to provide to the mobile communication device 116. In one or more embodiments, the diversity device 170 can include a first antenna 207a, a first amplifier 206a, and a first demodulator 208a for receiving a first version of the long-range communication signal 140 and demodulating the received signal to generate a first version of the baseband signal 255. The diversity device 170 can include a second antenna 207b, a second amplifier 206b, and a second demodulator 208b for receiving a second version of the long-range communication signal 140 and demodulating the received signal to generate a second version of the baseband signal 258. The diversity device 170 can be configured such that the first antenna 207a and the second antenna 207b are located in different places and/or set in different angular orientations such that signal diversity is achieved. In one or more embodiments, the diversity device 170 can include more than two signal paths for receiving more than two versions of the long-range communication signal 140. In one or more embodiments, a diversity selection module 260 can receive the first version of the baseband signal 255 and the second version of the baseband signal 258. The diversity selection module 260 can compare signal quality of the first and second versions of the baseband signal and select one of versions as the selected baseband signal 265 that can be provided to the mobile communication device 116 as a wired or wireless signal.

Figure 3:
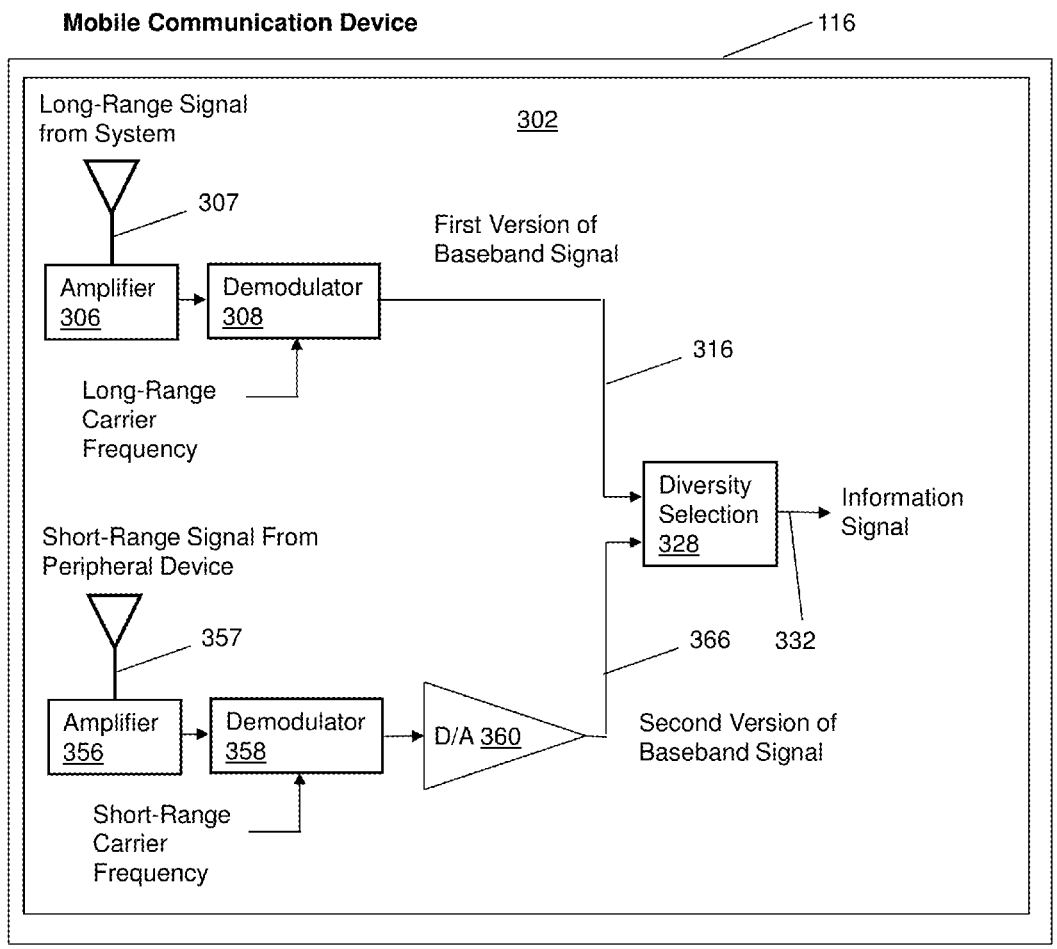
FIG. 3 depicts illustrative embodiments of a system for receiving and processing diverse signals at a mobile communication device.

FIG. 3 depicts illustrative embodiments of a system for receiving and processing diverse signals at a mobile communication device 116. In one or more embodiments, the mobile communication device 116 can include signal paths for receiving a long-range communication signal 140 and a short-range communication signal 160, for extracting a first version of a baseband signal 316 and a second version of a baseband signal 366, and for selecting and information signal 332 from the first and second versions of the baseband signal 316 and 366. In one or more embodiments, signal path for the long-range communication signal 140 can include a first antenna 307, a first amplifier 306, and a first demodulator 308. The first amplifier 306 can receive the long-range communications signal 140 from the first antenna 307. The first amplifier 306 can include a broadband filter to selectively filter out frequencies extraneous to the long-range carrier frequency. In one or more embodiments, the diversity server 130 can configure and/or adjust one or more coefficients of a broadband filter of the first amplifier 306. In one or more embodiments, the first demodulator 308 can receive a filtered and/or amplified version of the received long-range communications signal 140 and extract a first version of the baseband signal 316. In one or more embodiments, the first demodulator 308 can mix the received long-range communications signal with a long-range carrier frequency to extract the first version of the baseband signal 316 while removing the carrier signal. In one or more embodiments, the diversity server 130 can select and/or adjust the long-range carrier frequency that is mixed with the long-range communication signal such that the first demodulator 308 is tuned to a particular cellular communication channel.

In one or more embodiments, the signal path for the short-range communications signal 160 can include a second antenna 357, a second amplifier 356, and a second demodulator 358. The second amplifier 356 can receive the short-range communications signal 160 from the second antenna 357. The second amplifier 356 can include a broadband filter to selectively filter out frequencies extraneous to short-range carrier frequency. In one or more embodiments, the diversity server 130 can configure and/or adjust one or more coefficients of a broadband filter of the second amplifier 356. In one or more embodiments the second demodulator 358 can receive a filtered and/or amplified version of the received short-range communications signal 160 and extract a second version of the baseband signal 366. In one or more embodiments, the second demodulator 358 can mix the received short-range communications signal with a short-range carrier frequency to extract second version of the baseband signal 366 while removing the carrier signal. In one or more embodiments, the diversity server 130 can select and/or adjust the short-range. Frequency that is mixed with the long-range communications signal such that the second demodulator 358 is tuned to a particular short-range communication channel.

In one or more embodiments, the signal path for the short-range communications signal 160 can further include a digital to analog converter 360. If the short-range communications signal 160 has been generated at the diversity device 170 by converting the extracted baseband signal to 219 from analog to digital prior to modulating the baseband signal 219, then the signal path for the short-range communications signal 160 at the mobile communication device 116 can include a digital to analog converter 360 for converting the received second version of the baseband signal 366 from digital to analog. In one or more embodiments, a diversity selection module 328 can select between the first version of the baseband signal 316 and the second version of the baseband signal 366. The diversity selection module 328 can compare one or more signal qualities of the first version of the baseband signal 316 and the second version of the baseband signal 366 and use the signal quality comparison for selecting between the two versions. The diversity selection module 328 can generate an information signal 332 which can be used in further processing at the mobile communication device for voice and/or data applications.

In one or more embodiments, the diversity selection module 328 can monitory content corruption of the first and second baseband versions 316 and 366. For example, the diversity selection module 328 can determine bit error rates, cyclic redundancy code (CRC) error rates, or other error rates associated with the first and second versions 316 and 366 of the baseband content. In one or more embodiments, the diversity selection module 328 can select one of the baseband versions, such as the first version 316, as the information signal 332. As long as a corruption measure, such as bit error rate, for the first version of the baseband signal 316 stays below a threshold level, the diversity selection module 328 can continue to select and present the information signal 332. However, if corruption of the first version of the baseband signal 316 exceeds the threshold level, then the diversity selection module 328 can select the second version of the baseband signal 366 as long as the second version 366 is, itself, determined to be below the threshold level.

In one or more embodiments, the diversity selection module 328 can generate the information signal by combining the first and second versions 316 and 366 of the baseband signal. In one embodiment, the first version 316 and the second version 366 of the baseband signal can be added together. In one embodiment, a root mean square can be determined for the summed baseband signals 316 and 366, and, in turn, the root mean square can become a target gain level for the long-range signal amplifier 306 and the short-range signal amplifier 356. For example, the diversity selection module 328 can determine a root mean square for the first and second versions 316 and 366 of the baseband signal and, in turn, the diversity amplifier 328 can separately adjust signal path gains for the long-range amplifier 306 and the short-range amplifier 356 so that the each signal path is proportional.

Figure 4:
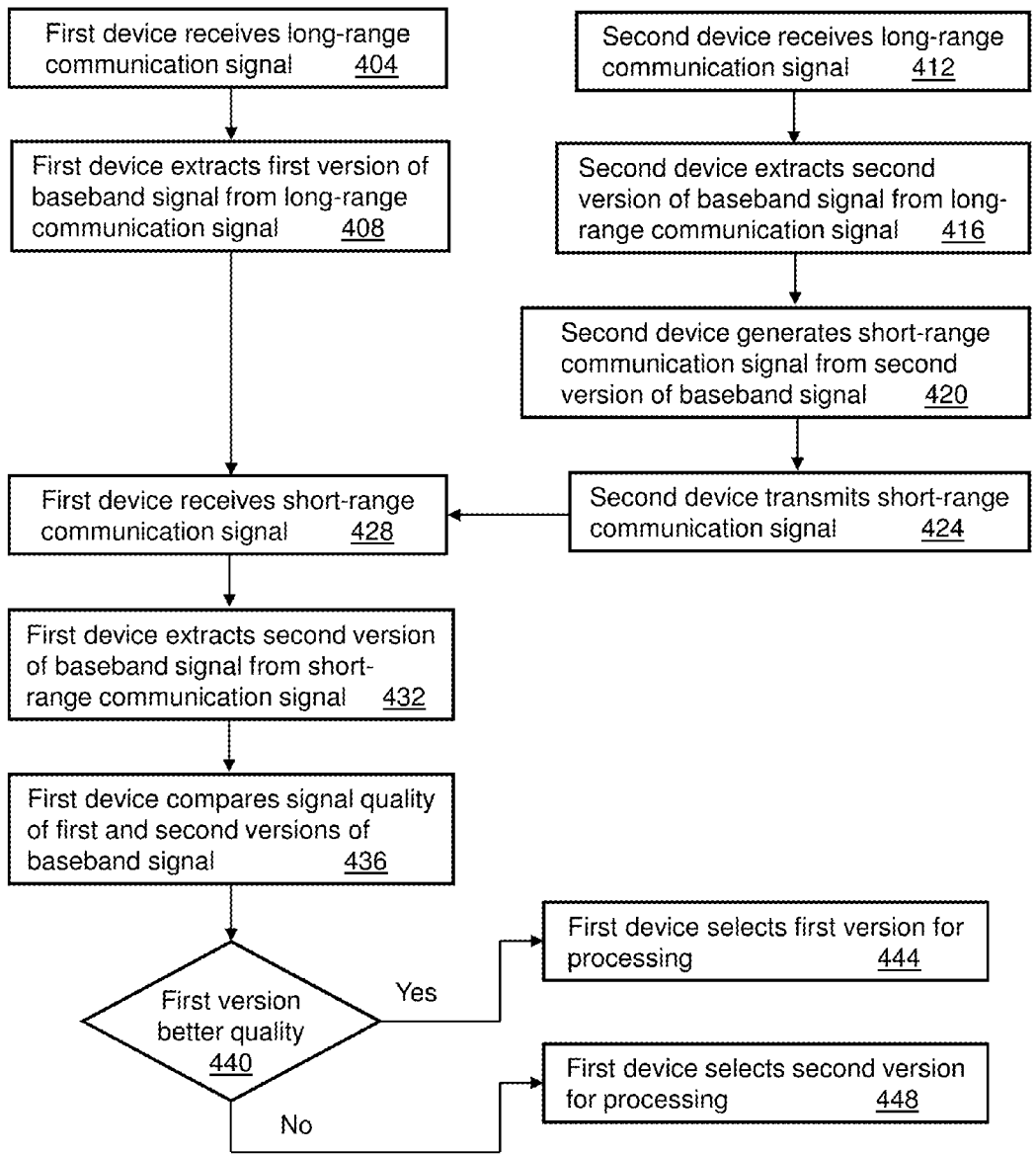
FIG. 4 depicts illustrative embodiments of a method used in portions of the system described in FIGS. 1, 2A, 2B, 3, and 5-6.

FIG. 4 depicts illustrative embodiments of a method 400 used in portions of the systems depicted in FIGS. 1, 2A, 2B, and 3. The method can begin at step 404, where a first device can receive a long-range communications signal, such as a cellular communication signal from a cellular base station. At step 408, the first device can extract a first version of a baseband signal from the long-range communications signal that has been received. In one embodiment, the first device can include an antenna, amplifier, and/or filter for capturing and selectively amplifying the long-range communications signal that is received. In one embodiment, the first device can include a demodulator and/or down converter for extracting the first version of the baseband signal from the carrier signal.

In one or more embodiments, at step 412, a second device can receive the long-range communications signal. In one or more embodiments, an antenna for receiving the long-range communications signal for the second device can be placed in a different location and/or different orientation than the antenna for the first device, such that the first device and the second device are receiving diverse versions of the long-range communications signal. At step 416, the second device can extract a second version of the baseband signal from the long-range communications signal. In one embodiment, the second device can include an antenna, amplifier, and/or filter for capturing and selectively amplifying the long-range communications signal that is received. In one embodiment the second device can include a demodulator and/or down converter for extracting the second version of the baseband signal from the carrier signal.

In one or more embodiments, at step 420, the second device can generate a short-range communications signal from the second version of the baseband signal. In one or more embodiments, the second device can include an analog-to-digital converter to encode the second version of the baseband signal into a digital format. The second device can include a modulator for modulating the second version of the baseband signal with a short-range carrier frequency to generate the short-range communications signal. At step 424, the second device can wirelessly transmit the short-range communications signal to the first device. In one embodiment, the second device Transmit second version of the baseband signal to the first device VA wireline connection.

In one or more embodiments, at step 428, the first device can receive the short-range communication signal. In one or more embodiments, the first device can include an antenna, amplifier, and/or filter for capturing and selectively amplifying the short-range communications signal that is received from the second device. At step 432, the first device can extract the second version of the baseband signal from the short-range communication signal is been received. In one embodiment the first device can include a demodulator and/or down converter for extracting second version of the baseband signal from the received short-range communications signal. In one embodiment the first device can include a digital to analog converter for re-converting the second version of the baseband signal from digital format to analog.

In one or more embodiments, at step 436, first device can compare one or more signal qualities of the first version of the baseband signal and the second version of the baseband signal. In one or more embodiments the signal qualities can include signal strength and/or bit error rate. At step 440, the first device can determine that the first version of the baseband signal has better signal quality and can of the baseband signal processing by the first device at step 444. If the first device determines that the first version of the baseband signal does not have the better signal quality at step 440, then the first device can select the second version of the baseband signal for processing. By adding substantial spatial diversity to the mobile communication device 116, the relative signal strength at the device 116 is enhanced. It is found that an improvement of 1 dB in signal strength over a communication link can correspond to a 26% increase in network capacity, greater than 10% extension in coverage, /or and reduced call dropping within existing coverage.

Upon reviewing the aforementioned embodiments, it would be evident to an artisan with ordinary skill in the art that said embodiments can be modified, reduced, or enhanced without departing from the scope of the claims described below. For example, the mobile communication device 116 can communicate with the IMS network 150 by sending a long-range communication signal to a cellular base station 117. In another embodiment the mobile communication device 116 can communicate with the IMS network 150, indirectly, by sending a short-range communications signal to the diversity device 170, where the diversity device 170 transmits a long-range communications signal to the cellular base station 170.

In one or more embodiments, the diversity device 170 can modulate the second version of the baseband signal with a high-frequency carrier. For example high-frequency carrier could be a 4 GHz signal. The resulting high-frequency, short-range communications signal can provide a high bandwidth diversity path. In one or more embodiments, the diversity device 170 can transmit the received long-range communications signal to the mobile communication device 116 via a wire line without demodulating the signal.

In one or more embodiments, the outputs of multiple antenna signals can be made available to the mobile communication device 116 by the diversity device 170. The mobile communication device 116 can dynamically choose which of the multiple antenna signals will be used based on dynamic diversity analysis. For example a round-robin sample from the multiple antenna signals can be periodically tested by the mobile communication device 116 to determine the best signal. Other embodiments can be used in the subject disclosure.

Figure 5:
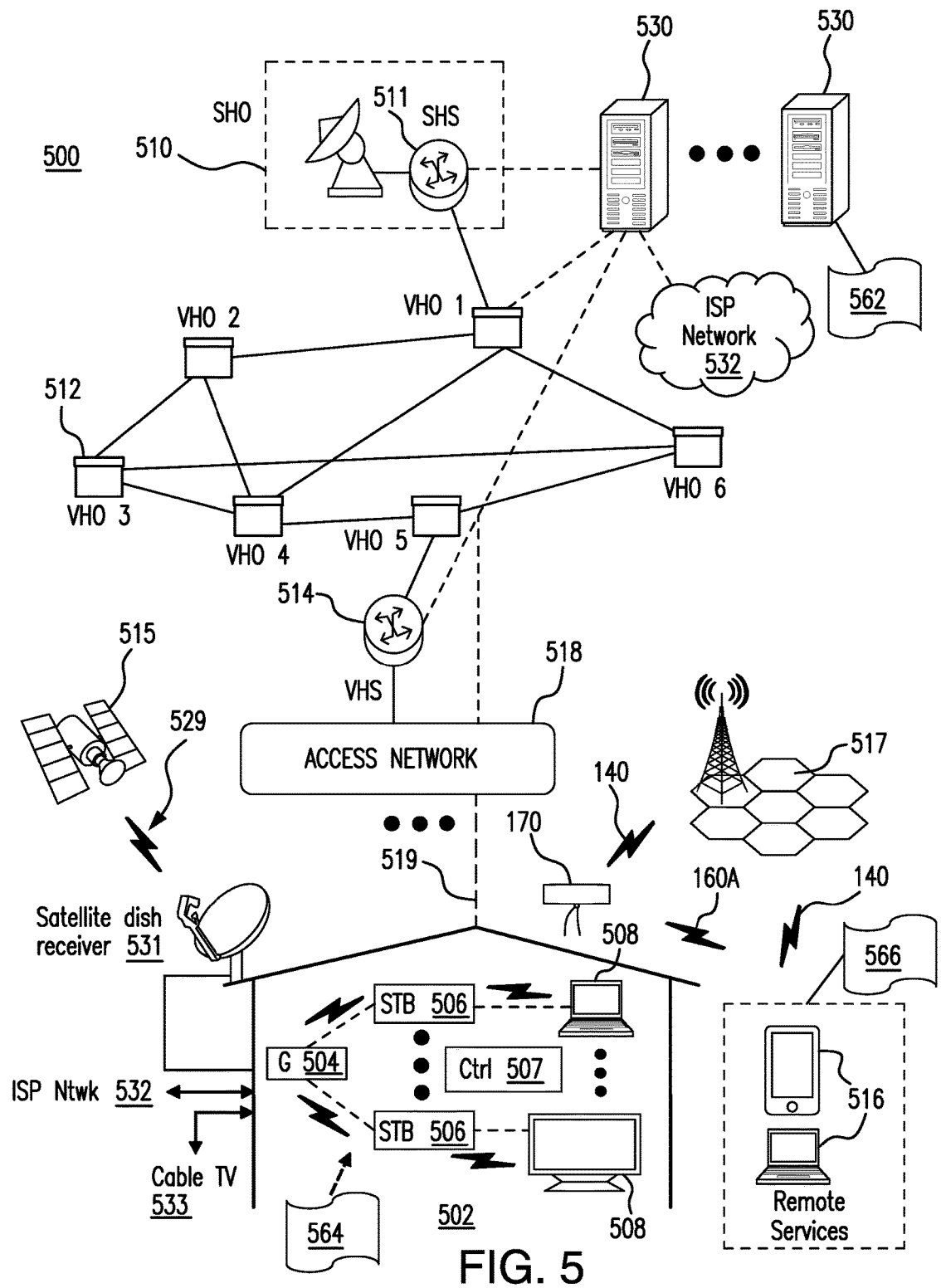
FIGS. 5-6 depict illustrative embodiments of communication systems that provide communication and media services for communication devices according to embodiments illustrated in FIGS. 1, 2A, 2B, and 3.

FIG. 5 depicts an illustrative embodiment of a first communication system 500 for delivering media content. The communication system 500 can represent an Internet Protocol Television (IPTV) media system. Communication system 500 can be overlaid or operably coupled with system 100 of FIGS. 1, 2A, 2B, and 3 as another representative embodiment of communication system 500. For instance, one or more devices illustrated in the communication system 500 of FIG. 5 can be used for providing communication signal diversity to a mobile communication device 516. The mobile communication device 516 can receive a long-range communication signal 140 from the communication system 500. The mobile communication device 516 can extract a first version of a baseband signal from the long-range communication signal. A diversity device 170 can also receive the long-range communication signal 140 at a different location. The diversity device 170 can extract a second version of the baseband signal from the long-range communication signal 140 and, in turn, can generate a short-range communication signal 160 based on the second version of the baseband signal. The mobile communication device 516 can receive the short-range communication signal 160 from the diversity device 170. The mobile communication device 516 can compare a quality of the first and second versions of the baseband signal to select one of the first or second versions of the baseband signal as an information signal that will be processed.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508, wireless communication devices 516, and/or diversity devices 170. For example, a diversity server 530 can communicate with a diversity device 170 to configure how the diversity device 170 provides a second version of a baseband signal from a long-range communication signal 140. In another example, a diversity server 530 can communicate with a mobile communication device 516 to configure how the mobile communication device 516 handles signal diversity between the first and second versions of the baseband signal.

Communication system 500 can also provide for all or a portion of the computing devices 530 to function as a diversity server 530 (herein referred to as server 530). The server 530 can use computing and communication technology to perform function 562, which can include among other things, the diversity techniques described by method 400 of FIG. 4. For instance, function 562 of server 530 can be similar to the functions described for servers 130 of FIG. 1 in accordance with method 400. The media processors 506 and wireless communication devices 516 can be provisioned with software functions 564 and 566, respectively, to utilize the services of widget 530. For instance, functions 564 and 566 of media processors 506 and wireless communication devices 516 can be similar to the functions described for the communication devices 116 of FIG. 1 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
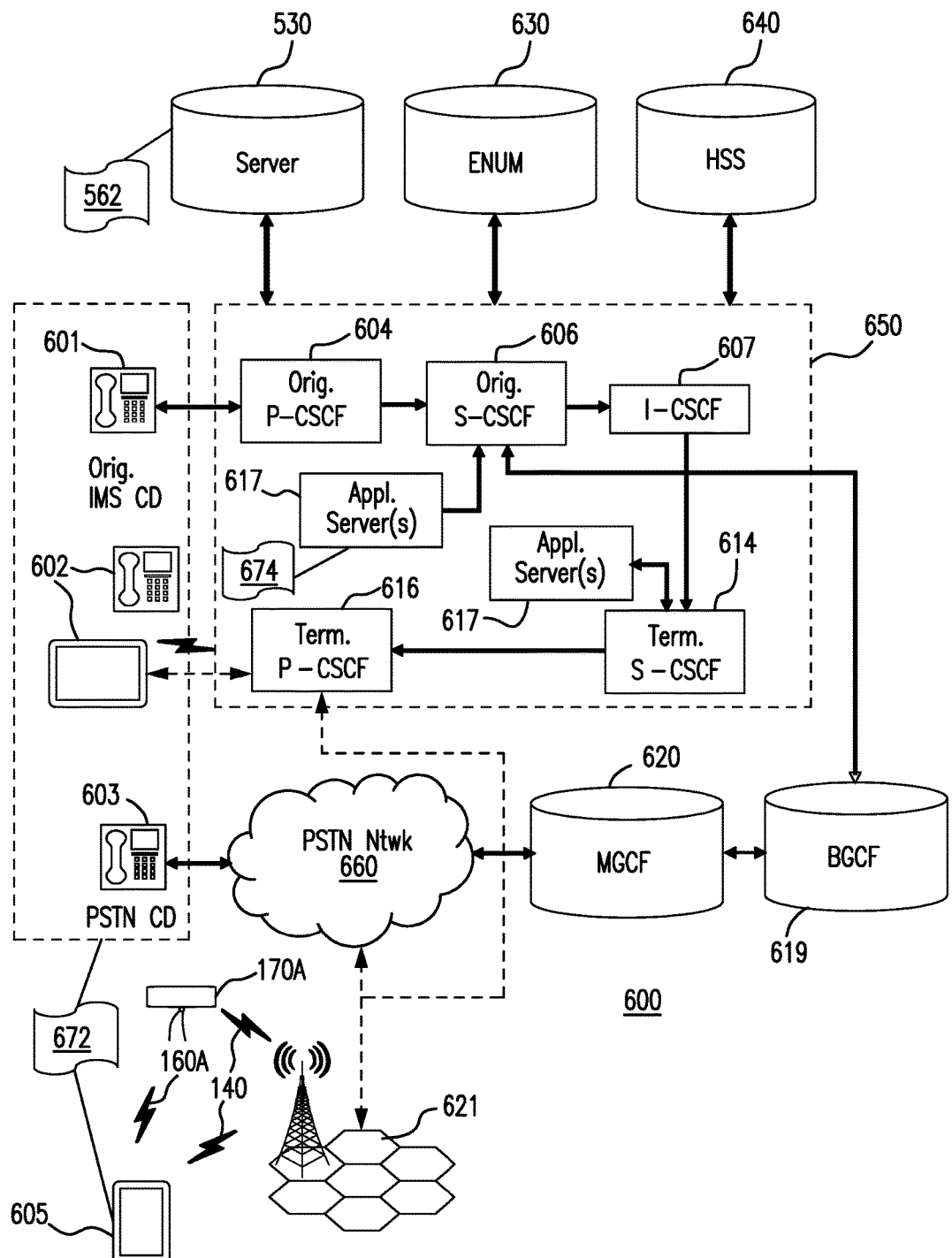

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with system 100 of FIGS. 1, 2A, 2B, and 5, and communication system 500 as another representative embodiment of communication system 500.

For instance, one or more devices illustrated in the communication system 600 of FIG. 6 can be used for providing communication signal diversity to a mobile communication device 605. The mobile communication device 605 can receive a long-range communication signal 140 from the communication system 500. The mobile communication device 605 can extract a first version of a baseband signal from the long-range communication signal 140. A diversity device 170 can also receive the long-range communication signal 140 at a different location. The diversity device 170 can extract a second version of the baseband signal from the long-range communication signal 140 and, in turn, can generate a short-range communication signal 160 based on the second version of the baseband signal. The mobile communication device 605 can receive the short-range communication signal 160 from the diversity device 170. The mobile communication device 605 can compare a quality of the first and second versions of the baseband signal to select one of the first or second versions of the baseband signal as an information signal that will be processed.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (aSs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference

602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 600 of FIG. 6.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

A diversity server 530 of FIG. 5 can be operably coupled to communication system 600 for purposes similar to those described above. The diversity server 530 can perform function 562 and thereby provide communication signal diversity services to the CDs 601, 602, 603 and 605 of FIG. 5 similar to the functions described for server 530 of FIG. 6 in accordance with method 400 of FIG. 4. CDs 601, 602, 603 and 605, which can be adapted with software to perform function 562 to utilize the services of the diversity server 530 similar to the functions described for communication devices 516 of FIG. 5 in accordance with method 400 of FIG. 4. The diversity server 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 7:
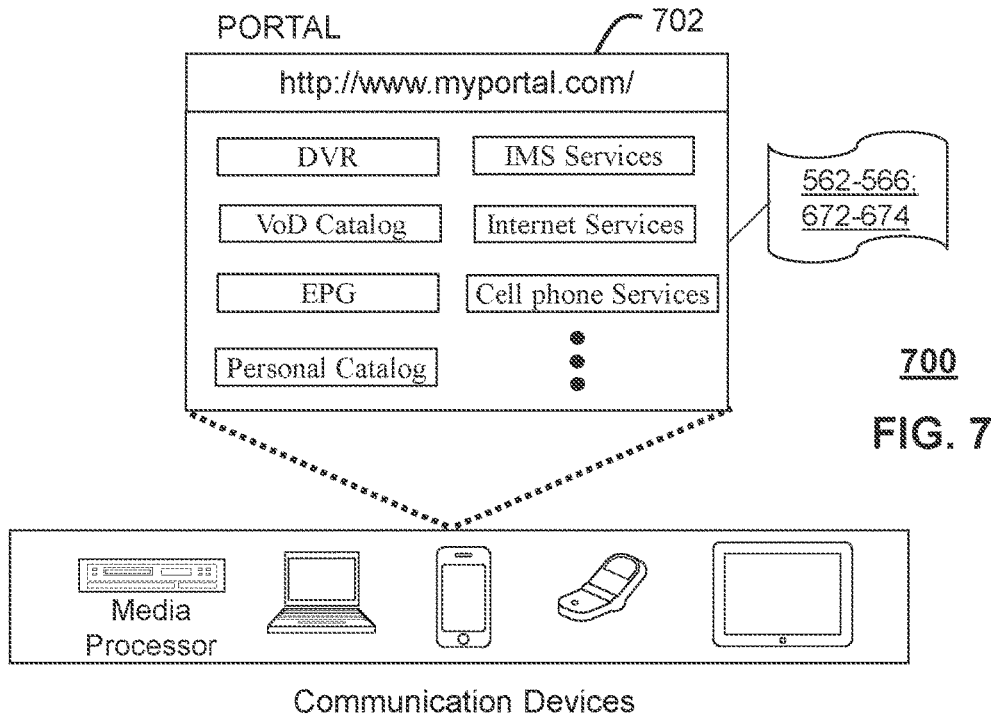
FIG. 7 depicts an illustrative embodiment of a web portal for interacting with the communication systems of FIGS. 1, 2A, 2B, 3, and 5-6.

FIG. 7 depicts an illustrative embodiment of a web portal 702 of a communication system 700. Communication system 700 can be overlaid or operably coupled with systems 100 of FIGS. 1, 2A, 2B, and 3, communication system 500, and/or communication system 600 as another representative embodiment of systems 100 of FIGS. 1, 2A, 2B, and 3, communication system 500, and/or communication system 600. The web portal 702 can be used for managing services of systems XXX of FIGS. 1, 2A, 2B, and 3, and communication systems 500-600. A web page of the web portal 702 can be accessed by a Uniform Resource Locator (URL) with an Internet browser using an Internet-capable communication device such as those described in FIGS. 1, 2A, 2B, and 3, and FIGS. 4-5. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of system 100 of FIGS. 1, 2A, 2B, and 3, and communication systems 500-600. For instance, users of the services provided by a diversity server 530 or server 530 can log into their on-line accounts and communicate with a diversity server 530, which can communicate with a diversity device 170 to configure how the diversity device 170 provides a second version of a baseband signal from a long-range communication signal 140. In another example, the web portal 702 can be used to communicate with a diversity server 530, which can communicate with a mobile communication device 516 to configure how the mobile communication device 516 handles signal diversity between the first and second versions of the baseband signal, and so on. Service providers can log onto an administrator account to provision, monitor and/or maintain the system 100 of FIGS. 1, 2A, 2B, and 3 and/or server 530 of FIGS. 5 and 6.

Figure 8:
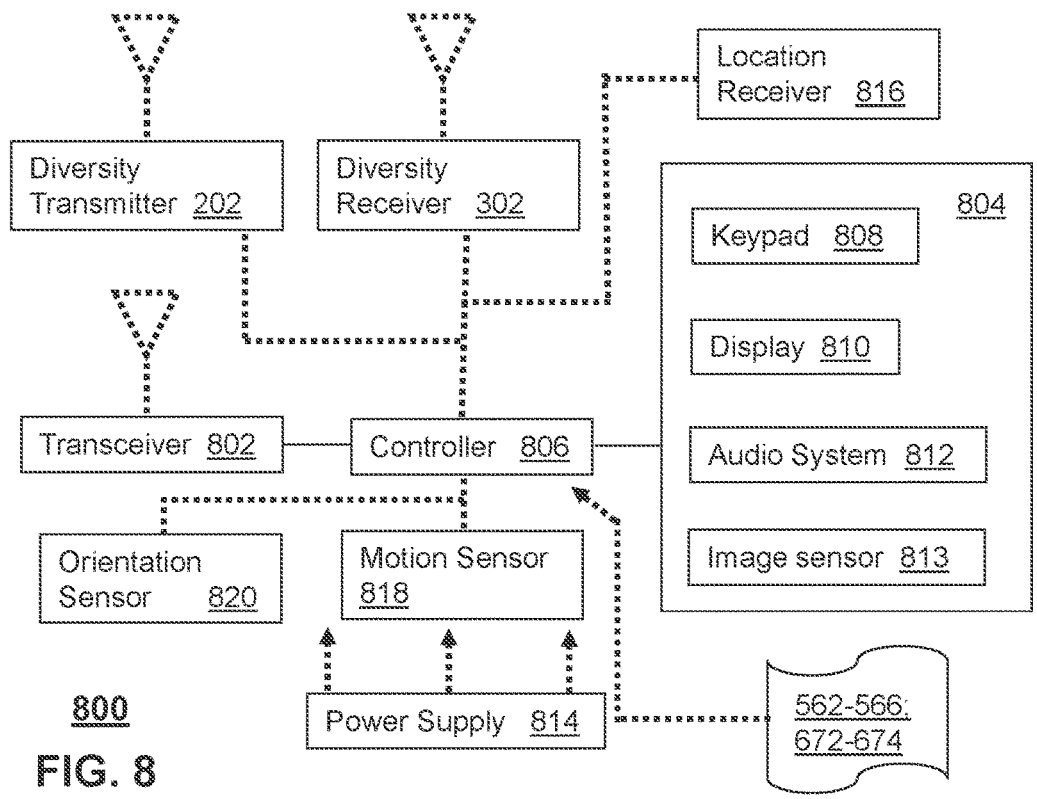
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 2A, 2B, 3, and FIGS. 4-5. Communication device 800 in whole or in part can represent any of the communication devices described in FIGS. 1, 2A, 2B, 3, and 4-5 and can be configured to perform portions of method 400 of FIG. 4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1, 2A, 2B, and 3, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems of FIGS. 1, 2A, 2B, and/or 3, communication systems 500-600 of FIGS. 5-6 such as a gaming console and a media player.

The communication device 800 shown in FIG. 8 or portions thereof can serve as a representation of one or more of the devices of system of FIGS. 1, 2A, 2B, and 3, communication system 500, and communication system 600. In addition, the controller 806 can be adapted in various embodiments to perform the functions 562-566 and 672-674, respectively.

For instance, the communication device 800 of FIG. 8 can be used for providing communication signal diversity to a mobile communication device 516 and/or for receiving communication signal diversity from a diversity device. A communication device 800 serving as a mobile communication device 516 can receive a long-range communication signal 140 from the communication system 500. The communication device 800 serving as the mobile communication device 516 can extract a first version of a baseband signal from the long-range communication signal. A communication device 800 serving as diversity device 170 can also receive the long-range communication signal 140 at a different location. The diversity device 170 can extract a second version of the baseband signal from the long-range communication signal 140 and, in turn, can generate a short-range communication signal 160 based on the second version of the baseband signal. The communication device 800 serving as a mobile communication device 516 can receive the short-range communication signal 160 from the diversity device 170. The communication device 800 serving as mobile communication device 516 can compare a quality of the first and second versions of the baseband signal to select one of the first or second versions of the baseband signal as an information signal that will be processed.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
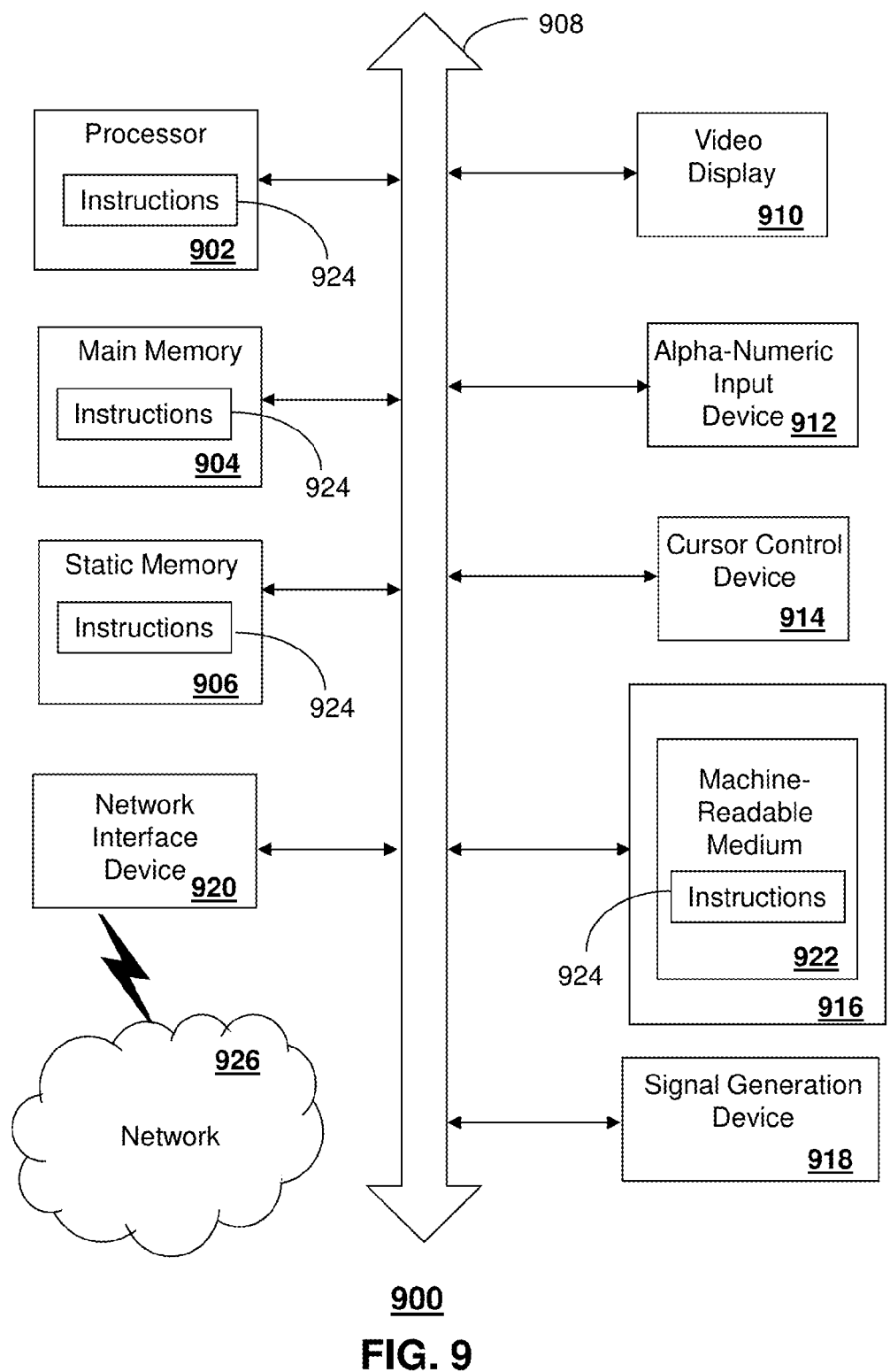
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the diversity server 530, the media processor 506, the mobile communication device 116, the diversity device 170 and 170B-D, and/or other devices of FIGS. 1-6. For instance, one or more instances of the machine can operate, for example, to provide communication signal diversity to a mobile communication device 516. The mobile communication device 516 can receive a long-range communication signal 140 from the communication system 500. The mobile communication device 516 can extract a first version of a baseband signal from the long-range communication signal. A diversity device 170 can also receive the long-range communication signal 140 at a different location. The diversity device 170 can extract a second version of the baseband signal from the long-range communication signal 140 and, in turn, can generate a short-range communication signal 160 based on the second version of the baseband signal. The mobile communication device 516 can receive the short-range communication signal 160 from the diversity device 170. The mobile communication device 516 can compare a quality of the first and second versions of the baseband signal to select one of the first version or the second version of the baseband signal as an information signal that will be processed.

In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
wirelessly receiving, by a mobile communication device, a first communication signal via a first antenna of the mobile communication device from a first network, wherein the first communication signal comprises a first version of a baseband signal that is modulated with a first carrier signal;
wirelessly receiving, by the mobile communication device, a second communication signal from a second device on a second network, wherein the second communication signal comprises a second version of the baseband signal that is modulated with a second carrier signal by the second device;
selecting, by the mobile communication device, a selected baseband signal from one of the first version of the baseband signal or the second version of the baseband signal according to a difference in signal quality between the first version of the baseband signal and the second version of the baseband signal; and
wirelessly transmitting, by the mobile communication device, a control signal to the second device, wherein the control signal directs the second device to adjust one of extracting of the second version of the baseband signal, modulating of the second version of the baseband signal, or a combination thereof.

2. The method of claim 1, wherein the second device comprises a peripheral input device for the mobile communication device.

3. The method of claim 1, wherein the first communication signal comprises a long-range communication signal received via a third antenna of the second device and wherein the third antenna is oriented differently than the first antenna of the mobile communication device.

4. The method of claim 1, wherein the second communication signal comprises a short-range communication signal that is compatible with Bluetooth technology.

5. The method of claim 1, further comprising wirelessly receiving, by the mobile communication device, a second control signal from the second device for directing an operation by the mobile communication device.

6. The method of claim 1, further comprising wirelessly transmitting, by the mobile communication device, a second control signal to the second device for directing an operation by the second device.

7. The method of claim 1, wherein a plurality of communication signals are received at the second device, and wherein the first communication signal comprises a long-range communication signal extracted from the plurality of communication signals that are received by the second device according to a filtering configuration.

8. The method of claim 7, further comprising wirelessly transmitting, by the mobile communication device, a third control signal to the second device for directing the second device to adjust the filtering configuration.

9. The method of claim 1, wherein the first communication signal comprises a long-range communication signal decoded by the second device and wherein the second version of the baseband signal comprises a digital representation of one of an audio signal, a video signal, a data signal, or a combination thereof.

10. The method of claim 1, further comprising:
wirelessly receiving, by the mobile communication device, the first communication signal comprising a long-range communication signal via a third antenna of the mobile communication device; and
extracting, by the mobile communication device, a third version of the baseband signal from the long-range communication signal that is received via the third antenna,
wherein the difference in signal quality is further determined with respect to the third version of the baseband signal.

11. The method of claim 1, wherein the signal quality comprises one of a signal-to-noise ratio, a frame erasure rate, or a combination thereof.

12. The method of claim 1, wherein the first communication signal comprises a long-range communication signal received by the second device at a plurality of antennas and wherein the second device selects the second version of the baseband signal from a plurality of baseband signals extracted from a plurality of versions of the long-range communication signal received at the plurality of antennas.

13. A diversity device comprising:
a memory to store executable instructions; and
a processor communicatively coupled to the memory, wherein the executable instructions, responsive to being executed by the processor, facilitate performance of operations comprising:
wirelessly receiving a long-ranged communication signal comprising a first information signal modulated with a first carrier signal;
demodulating the first information signal from the long-ranged communication signal;
modulating the first information signal with a short-range carrier signal to generate a short-range communication signal;

transmitting the short-range communication signal to a communication device; and receiving a control signal from the communication device for directing operation of the diversity device.

14. The diversity device of claim 13, wherein the processor comprises a plurality of processors operating in a distributed processing environment and the operations further comprise: encoding the first information signal into a digital format before the modulating.

15. The diversity device of claim 13, wherein the operations further comprise: wirelessly transmitting a control signal to the communication device for directing operation of the communication device.

16. The diversity device of claim 13, wherein the operations further comprise:

adjusting one of demodulating or modulating the first information signal according to the control signal that is received.

17. The diversity device of claim 13, wherein the operations further comprise:

wirelessly receiving the long-range communication signal via a plurality of antennas;

extracting a plurality of versions of the first information signal from the first carrier signal of the long-range communication signal that is received via the plurality of antennas; and selecting a first version of the first information signal from the plurality of versions of the first information signal.

18. The diversity device of claim 13, wherein the diversity device comprises a peripheral input device for the communication device.

19. A machine-readable storage device comprising executable instructions that, responsive to being executed by a processor, facilitate performance of operations comprising:

down-converting a long-range communication signal that is wirelessly received via a first antenna of a communication device to extract a first version of a baseband signal, wherein the long-range communication signal comprises a cellular communication signal;

down-converting a short-range communication signal that is wirelessly received from a second device via a second antenna of the communication device to extract a second version of the baseband signal;

combining the first version of the baseband signal and the second version of the baseband signal to generate an informational signal; and wirelessly transmitting a control signal to the second device to direct an operation of the second device based on the informational signal.

20. The machine-readable storage device of claim 19, wherein the processor comprises a plurality of processors operating in a distributed processing environment, and wherein the combining comprises:

adding the first version of the baseband signal to the second version of the baseband signal to determine a combined signal; and adjusting a first configuration for wirelessly receiving the long-range communication signal according to the combined signal.

\* \* \* \* \*